June 27, 1944.  W. A. SMITH  2,352,350
PRESSURE LEAKAGE GAUGE
Filed March 29, 1943
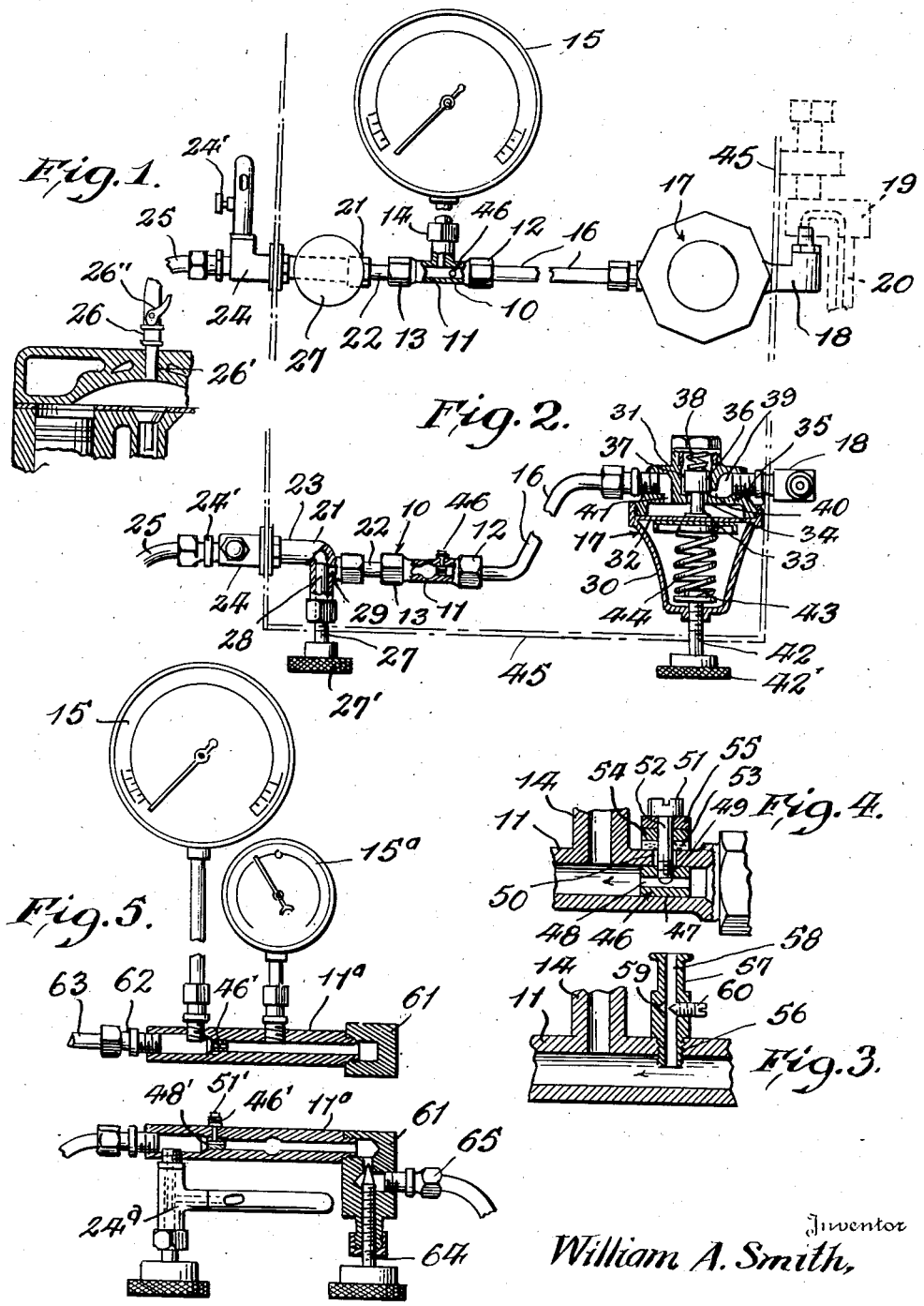
Inventor
William A. Smith,
By Christian L. Nielsen
Attorney Patented June 27, 1944

2,352,350

UNITED STATES PATENT OFFICE 2,352,350

PRESSURE LEAKAGE GAUGE

William A. Smith, Philadelphia, Pa.

Application March 29, 1943, Serial No. 480,985

3 Claims. (Cl. 73—51)

This invention relates to gas leakage meters and more particularly to improved apparatus for measuring and locating leakage from engine cylinders, tanks and the like, and it consists in the constructions, arrangements and combinations herein described and claimed.

Efficient performance and economy of an engine are dependent upon the condition of the rings, valves, gaskets and other elements of an engine which function to provide a proper compression for explosive gases within the cylinders of the engine. Obviously, if there is leakage past the rings, valves or gaskets during the compression and firing strokes of an engine, proper and efficient operation of the motor cannot be obtained. To obtain a proper performance, it is necessary that the leakage be located and remedied, and to this end it is an object of the invention to provide an efficient leakage gauge for locating and measuring gas leakage of an engine or the like.

It is also an object of the invention to provide a signal means for positively determining piston positions at any point on compression stroke, including top dead center of a piston, which positions are essential to obtain, in order that the test of the inlet and outlet valves of the engine may be made.

It is a still further object of the invention to provide a novel construction of balancing "bleed" to stabilize readings and make possible accurate setting of the indicator needle at predetermined pressure points.

It is also an object of the invention to provide an adjustable restrictor so designed as to compensate for errors and compensate for wear or any changes during use.

Additional objects, advantages and features of the invention will be apparent from the following description and accompanying drawing, wherein Figure 1 is a front elevation of the gauge, partly in section, illustrating its installation upon an internal combustion engine, the latter being shown in fragmentary section.

Figure 2 is a top plan view of the gauge partly in section.

Figure 3 is an enlarged cross section illustrating the construction of a balancing bleed valve employed in the gauge.

Figure 4 is an enlarged cross section of an adjustable restrictor which may be employed in the gauge.

Figure 5 is a front elevation of a modified form of gauge, partly in section.

Figure 6 is a horizontal cross section thereof.

There is illustrated in Figures 1 and 2 a pressure leakage gauge 10 which comprises a manifold 11 substantially in the form of a T-fitting including inlet and outlet connections 12 and 13 and a right angular extension 14 upon which there is mounted a pressure gauge 15. An air conduit 16 is connected between the inlet 12 and pressure regulator 17, the latter having an air inlet 18 adapted to receive a chuck 19 of an air hose 20. To the outlet end 13 of the manifold a control valve fitting 21 is connected by way of a short section of conduit 22.

The valve fitting 21 is substantially L-shaped as seen in top plan, the right angular extension 23 forming a means for mounting a whistle valve 24. The whistle valve 24 has a flexible conduit 25, the terminal of which mounts a spark plug hole adapter 26. The other extension of the valve fitting 21 has a valve 27 threadedly engaged therein, the stem 28 thereof being of a length to control the passage of air through the port 29 which is in communication with the manifold 11, the stem being actuated through a knob 27'.

The pressure regulator may be of any conventional construction, but as here shown comprises a bell-shaped housing 30, the open end of which is preferably screw-threaded for mounting of a cap member 31, ported and valved for passage and control of air from the inlet 18, as will be described. A diaphragm 32 is secured between the open end of the housing and the cap and centrally thereof an upright stem 33 is secured of a diameter to pass freely through a bore 34 formed in a wall 35 of the cap. The stem 33 terminates in a valve 36 freely movable in a chamber 37 of the cap. The valve 36 is normally held to its seat by means of a helical spring 38. A chamber 39 is formed in the cap 31 and in communication with the inlet 18, the chamber 39 also having a port 40 opening into the chamber 37. The wall 35 has a port 41 in communication with the conduit 16.

The housing 30 has a threaded axial opening in which a threaded stem 42 is mounted, the inner end of which has a plate 43 forming a seat for one end of a helical spring 44, the other end of the spring being seated against the underside of the diaphragm 32. By turning the stem 42 by means of the knob 42' the action of the diaphragm and its associated valve may be regulated as will be explained hereinafter.

It is intended that the unit shall be enclosed in a suitable cabinet 45 indicated by dot and dash lines, and only the inlet connection 18, the whistle valve 24, the pressure gauge 15 and the operating knobs 27' and 42' are exposed to the exterior of the cabinet.

An adjustable restrictor plug 46 is provided in the manifold 11 located between the pressure regulator 17 and the pressure dial 15. As may be seen in Figure 4, a restrictor sleeve 47 is disposed within the bore of the manifold and includes a bore 48 of considerably less diameter than the bore through the manifold 11. Intermediate the length of the plug 46 an aperture 49 is provided and extended at right angles to the bore 48 and in alinement with an opening 50 formed in the manifold. An adjusting bolt 51 having a threaded stem 52 is provided, including a compression washer 53, a compression nut 54 and a lock nut 55. The stem 52 is extended through the aperture 50 of the manifold and threadedly engaged within the aperture 49 of the plug so as to dispose the compression washer immediately above and overlying the aperture 50. It should be noted that the aperture 50 is of a diameter slightly greater than the diameter of the stem 52 so as to permit passage of air in varying quantities by adjustment of the valve, for a purpose to be explained.

The spark plug hole adapter 26 is preferably of a quick detachable type and as shown, comprises an expansible nozzle 26' adapted to be freely positioned within the spark plug hole of an engine; and then expanded therein for secure retention, upon manipulation of the hand lever 26''. Adapters of this type are well known in the art and a detail description and illustration is believed not essential to a full understanding of the present invention.

When a test of a motor is to be made, the motor must be at operating temperature. All spark plugs are removed and the adapter 26' is then inserted in one of the plug openings and secured therein. In order to obtain the top dead center of the piston in the cylinder under test, the control valve 27 is closed, as shown in Figure 2. The whistle valve 24' is now opened, and the motor turned, which may be accomplished by pulling on the fan belt; rocking the car while in gear or quickly bumping the starter switch. As the piston comes up on the compression stroke, air will be forced out through the adapter 26 and hose 25 to the whistle 24 which will be sounded. At this point the inlet and exhaust valves of the motor will be closed and the first test or reading can be taken, namely the condition of the valves. The whistle valve 24' is now closed. The car is then put in gear and the brakes are applied so that the piston is held against downward movement. The chuck 19 and hose 20 from a suitable air supply being operatively connected to the air inlet 18, the knob 42' is rotated so as to permit opening of the valve 36, admitting air under pressure which is passed into the manifold 11 and the gauge 15 until the desired pressure is attained. The valve 27 is now opened to admit air to the cylinder to be tested. If the valves of the cylinder under test should be defective, permitting leakage of air, the hand of the gauge 15 will read the cylinder loss in percent on the dial. Obviously, the air supply may be adjusted through adjustment of the valve 36, but if an excessive amount of air has been admitted in the manifold, it is impossible to obtain a zero position of the hand of the dial 15. In such case, the bolt 51 may be loosened and rotated so as to release compression of the washer 53, allowing air to pass through the opening 50 of the manifold and past the compression washer 53 to the atmosphere.

When sufficient air has been allowed to escape as indicated by the hand on the dial 15, the bolt 51 is rotated to compress the washer 53 to seal the opening 50.

In the event that a cylinder loss is indicated on the dial, the exhaust valve of the engine can be checked by listening with the aid of a stethoscope at the tail pipe or exhaust manifold. If a hissing sound occurs the exhaust valve is defective. The intake valve can be checked by listening at the air intake of the carburetor. The piston and rings of the engine can be tested for leakage by listening at the oil filter or breather pipe of the engine, and if leaky gaskets are suspected, bubbles will be produced by reason of leaking air passing through the water of the radiator. Each cylinder must be checked, and preferably in the firing order of the engine.

In Figure 3 a form of bleed valve is shown particularly useful in the form shown in Figure 1. In this instance, the manifold 11 is provided with a threaded opening 56 into which a nipple 57 is secured. The nipple has a bore 58 in communication with the manifold and opening to the atmosphere. Intermediate of the length of the nipple a valve seat 59 is formed complemental to a valve 60 which is threadedly engaged in the nipple 57. The valve seat 59 and the valve 60 are positioned transversely of the bore 58, and when the valve 60 is fully seated, the bore 58 is closed so that air cannot escape therethrough. The bleed valve shown and described permits a very quick bleeding of the manifold for obtaining a zero reading on the dial, which is desirable where the device may be used in conjunction with a test of large containers, tanks and the like.

In the form of meter shown in Figures 5 and 6, the pressure regulator is omitted and a pair of indicator dials are employed. The manifold is indicated at 11—a having a fitting 61 secured at one end thereof, the opposite end being tapped for reception of a fitting 62 having a hose 63 corresponding to the hose 25 of the first form of the device. The fitting 61 includes a needle valve 64 corresponding to the valve 42 and an air hose connection 65 which is connected with a suitable source of air supply. The restrictor 46' is constructed as before described and is positioned between the ducts leading to the gauges 15 and 15—a. The whistle valve 24—a is engaged with the manifold in advance of the fitting 62.

In the use of this form of meter, the top center of the piston under test is located by opening the whistle valve 24—a, which will be sounded on the compression stroke of the piston. As soon as the whistle stops sounding the piston is on top center and the intake and exhaust valves are closed. The whistle valve is now closed and the valve 64 is opened, admitting air to the manifold 11—a, the gauge 15—a and gauge 15, passage to the latter being restricted by reason of the reduced bore 48' of the restrictor plug 46'. The hand of the gauge 15—a is to indicate the zero position and may be adjusted by increase or decrease of the air passing through the valve 64 as well as by adjustment of the bolt 51' of the restrictor plug. By balancing the indicator hand of the dial 15—a at the zero position, air pressure in the cylinder under test will be 50 pounds per square inch. Any power loss will be indicated on the dial 15.

While I have shown and described preferred forms of the meter, this is by way of illustration only, and I consider as my own all such modifications in construction as fairly fall within the scope of the appended claims.

I claim:

1. A leakage gauge including a manifold having a regulatable air inlet and an air outlet having means for connection with a chamber to be tested, a pressure gauge operatively connected to the manifold and receiving air from the inlet, a restrictor plug in said manifold in advance of said pressure gauge, the restrictor plug consisting of means forming a reduced bore having a threaded opening in registry with an air outlet opening formed in the manifold, a threaded member engaged in the threaded opening of the restrictor plug, and a compressible disk carried by the threaded member for regulating the amount of air passing through the air outlet opening of the manifold.

2. A leakage gauge including a manifold having a regulatable air inlet and an air outlet having means for connection with a chamber to be tested, a whistle in said air outlet having a valve for controlling air passing therethrough, a pressure gauge operatively connected to the manifold and receiving air from the air inlet, a restrictor plug in said manifold in advance of the pressure gauge, the restrictor plug consisting of means forming a reduced bore having a threaded opening in registry with an air outlet opening formed in the manifold, a bolt member engaged in the threaded opening of the restrictor plug, a compressible disk on the bolt complemental to the air outlet opening for regulating the amount of air passing through the air outlet opening by adjustment of the bolt, and a valve member operatively connected to said manifold positioned between the pressure gauge and said whistle.

3. A leakage gauge including a manifold having a regulatable air inlet and an air outlet, a pressure gauge operatively connected to the manifold and receiving air from the inlet, a restrictor plug in said manifold in advance of said pressure gauge, said plug including means for bleeding the manifold consisting of an opening formed in the manifold, a compression washer positioned above the opening and means for compressing the washer upon and around said opening.

WILLIAM A. SMITH.